(12) United States Patent
Balasubramaniam et al.

(10) Patent No.: US 11,869,032 B2
(45) Date of Patent: Jan. 9, 2024

(54) COMPUTER SYSTEM AND METHOD FOR OFFERING COUPONS

(71) Applicant: Medixin Inc., Toronto (CA)

(72) Inventors: Balarajan Balasubramaniam, Toronto (CA); Mohammadrasool Raeesi Nafchi, Richmond Hill (CA)

(73) Assignee: MEDIXIN INC., Toronto (CA)

( * ) Notice: Subject to any disclaimer, the term of this patent is extended or adjusted under 35 U.S.C. 154(b) by 180 days.

(21) Appl. No.: 17/038,107

(22) Filed: Sep. 30, 2020

(65) Prior Publication Data

US 2021/0097567 A1 Apr. 1, 2021

Related U.S. Application Data

(60) Provisional application No. 62/908,656, filed on Oct. 1, 2019.

(51) Int. Cl.

| | |
|---|---|
| G06Q 30/02 | (2023.01) |
| G06Q 30/0238 | (2023.01) |
| G06Q 30/0234 | (2023.01) |
| G06N 3/08 | (2023.01) |
| G06K 7/14 | (2006.01) |
| G06Q 30/0207 | (2023.01) |

(52) U.S. Cl.
CPC ....... *G06Q 30/0238* (2013.01); *G06K 7/1417* (2013.01); *G06N 3/08* (2013.01); *G06Q 30/0224* (2013.01); *G06Q 30/0234* (2013.01)

(58) Field of Classification Search
CPC .......... G06Q 30/0238; G06Q 30/0224; G06Q 30/0207–30/0277
See application file for complete search history.

(56) References Cited

U.S. PATENT DOCUMENTS 9,646,286 B2 * 5/2017 Brelig ................ G06Q 10/0875
9,684,826 B2 6/2017 Dubuque
(Continued)

FOREIGN PATENT DOCUMENTS

AU 2013207407 A1 10/2013
EP 2487875 A2 8/2012

*Primary Examiner* — Thuy N Nguyen
(74) *Attorney, Agent, or Firm* — Own Innovation Inc.; James W. Hinton; Kent C. Howe

(57) ABSTRACT

A computer system and method for offering coupons to a user is provided herein. The computer system includes a coupon offering server. The coupon offering server includes a shopping container image processor configured to detect a pre-purchase item in shopping container image data. The shopping container image processor includes an object detector module and a barcode detector module. The object detector module is configured to generate first detected item data, wherein the first detected item data includes an item detected in the shopping container image data using an object detection technique. The barcode detector module is configured to generate second detected item data, wherein the second detected item data includes an item detected in the shopping container image using a barcode detection technique. The computer system also includes a coupon matcher engine. The coupon matcher engine is configured to receive the first and second detected item data from the shopping container image processor and generate matched coupon data using the first and second detected item data.

17 Claims, 9 Drawing Sheets

(56) References Cited

U.S. PATENT DOCUMENTS

| | | | |
|---|---|---|---|
| 10,318,907 B1* | 6/2019 | Bergstrom | H04N 5/232 |
| 10,402,847 B2 | 9/2019 | Marcus | |
| 10,693,659 B2* | 6/2020 | Bergmann | H04L 9/0869 |
| 10,970,731 B1* | 4/2021 | Latifi | H04L 51/10 |
| 11,074,637 B2* | 7/2021 | Davis | H04N 23/00 |
| 11,127,061 B2* | 9/2021 | Herring | G07G 1/0072 |
| 11,157,954 B1* | 10/2021 | Belanger | G06Q 30/0201 |
| 11,694,227 B1* | 7/2023 | Belanger | G06Q 30/0255 |
| | | | 705/14.49 |
| 2009/0276307 A1* | 11/2009 | Griffith | G06Q 30/00 |
| | | | 705/26.1 |
| 2010/0306080 A1* | 12/2010 | Trandal | G06Q 10/10 |
| | | | 705/26.8 |
| 2012/0007227 A1 | 1/2012 | Cho et al. | |
| 2012/0041845 A1* | 2/2012 | Rothschild | G06Q 20/20 |
| | | | 705/26.81 |
| 2012/0290418 A1* | 11/2012 | Itwaru | G06Q 30/04 |
| | | | 705/16 |
| 2013/0223673 A1* | 8/2013 | Davis | G06Q 20/208 |
| | | | 235/375 |
| 2014/0006128 A1* | 1/2014 | Grigg | G06Q 30/0253 |
| | | | 705/14.23 |
| 2015/0095189 A1* | 4/2015 | Dharssi | G06V 10/56 |
| | | | 705/26.8 |
| 2015/0106181 A1* | 4/2015 | Kluth | G06Q 30/0222 |
| | | | 705/14.23 |
| 2016/0063532 A1 | 3/2016 | Loeb et al. | |
| 2016/0078467 A1* | 3/2016 | Vosters | G06Q 30/02 |
| | | | 705/14.33 |
| 2016/0104189 A1* | 4/2016 | Marcus | G06Q 30/0213 |
| | | | 705/14.34 |
| 2016/0110703 A1* | 4/2016 | Herring | G06Q 20/18 |
| | | | 705/23 |
| 2016/0148241 A1* | 5/2016 | Walsh | G06Q 30/0238 |
| | | | 705/14.26 |
| 2017/0185846 A1* | 6/2017 | Hwangbo | G06V 20/47 |
| 2017/0206536 A1* | 7/2017 | Brelig | G06Q 10/0875 |
| 2017/0287137 A1* | 10/2017 | Lin | G06T 7/12 |
| 2018/0232754 A1* | 8/2018 | Bostick | G06Q 30/0269 |
| 2018/0233219 A1* | 8/2018 | Cathcart | G06Q 40/08 |
| 2019/0108396 A1* | 4/2019 | Dal Mutto | G06V 20/52 |
| 2019/0213212 A1* | 7/2019 | Adato | G06T 7/75 |
| 2019/0228313 A1* | 7/2019 | Lee | G06N 3/088 |
| 2020/0082425 A1* | 3/2020 | Corrieri | G06Q 20/20 |
| 2020/0097723 A1* | 3/2020 | Ebrahimpour | G06V 20/10 |
| 2020/0118423 A1* | 4/2020 | Moura | G08G 1/04 |
| 2020/0198680 A1* | 6/2020 | Hagen | H04B 5/0062 |
| 2020/0218994 A1* | 7/2020 | Kobayashi | G06N 5/025 |

* cited by examiner

Mobile Application 352

User Interface 602
Camera Accessor Module 604
Location data accessor module 606
Device notification system accessor module 608
Coupon Displayer Module 610
　Human-readable Displayer 612
　Machine-readable Displayer 614
Expense Reporter Module 616
Expense Categorizer Module 618
Shopping List Generator Module 620

FIG. 6

COMPUTER SYSTEM AND METHOD FOR OFFERING COUPONS

TECHNICAL FIELD

The following relates generally to coupon systems, and more particularly to systems and methods for offering coupons to consumers.

INTRODUCTION

Offering discount coupons has become a very popular advertisement approach for retail businesses. Coupons can attract business from consumers, increase sales, augment promotions, and help move merchandise. Coupon offerings are very popular with customers as well, as they present welcome opportunities to save money on various purchases and help customers manage tight purchasing budgets and spending.

Existing approaches to offering coupons to targeted customers, however, can be ineffective and inefficient. Such approaches can also be expensive for the coupon providers.

Finding and/or keeping track of coupons using current methods can require significant expenditure of time and energy on the part of customers. Many customers lead busy lives and do not want or need to dedicate further cognitive capacity to manage and use coupon offerings using existing approaches. Customers often have to search for, be aware of, and control coupons before going shopping, which can be time-consuming and lead to missed opportunities for redeeming coupons.

Accordingly, there is a need for an improved system and method for offering coupons to customers that overcomes at least some of the disadvantages of existing systems and methods.

SUMMARY

A computer system for offering coupons to a user is provided herein. The computer system includes a coupon offering server. The coupon offering server includes a shopping container image processor and a coupon matcher engine. The shopping container image processor is configured to detect a pre-purchase item in shopping container image data. The shopping container image processor includes an object detector module and a barcode detector module. The object detector module is configured to generate first detected item data, wherein the first detected item data includes an item detected in the shopping container image data using an object detection technique. The barcode detector module is configured to generate second detected item data, wherein the second detected item data includes an item detected in the shopping container image using a barcode detection technique. The coupon matcher engine is configured to receive the first and second detected item data from the shopping container image processor and generate matched coupon data using the first and second detected item data.

The coupon offering server may include a receipt processor configured to detect a post-purchase item in receipt image data.

Detecting the post-purchase item in the receipt data may include detecting a purchased item identifier and at least one of a store identity and a store location in the receipt image data.

The system may include a user device communicatively connected to the coupon offering server via a network. The user device includes an application configured to transmit the shopping container image to the coupon offering server via the network, receive the matched coupon data from the coupon offering server, and display the matched coupon data.

The coupon offering server may include a location data processor configured to receive location data from a user device communicatively connected to the coupon offering server, wherein the location data represents a current location of the user; and determine a store identity using the location data.

The coupon matcher engine may be configured to receive the store identity and generate the matched coupon data using the store identity.

The barcode detection technique may include localizing a barcode in the shopping container image data and decoding the localized barcode. The barcode detector module may be configured to retrieve an item identifier using the detected barcode.

The shopping container image processor may be further configured to generate aggregated detected item data from the first detected item data and second detected item data.

The aggregated detected item data may be generated by comparing the first detected item data and the second detected item data to identify differentially identified items.

The differentially identified items may be used in a training process for training at least one of the object detector module and barcode detector module.

The coupon matcher engine may be configured to receive historical purchase data for the user and generate the matched coupon data using the historical purchase data.

A method of offering coupons to a user is also provided. The method includes receiving shopping container image data and detecting a pre-purchase item in the shopping container image data. Detecting the pre-purchase item includes generating first detected item data, wherein the first detected item data includes an item detected in the shopping container image data using an object detection technique; and generating second detected item data, wherein the second detected item data includes an item detected in the shopping container image using a barcode detection technique. The method also includes generating matched coupon data using the first and second detected item data.

The method may include generating a machine-readable representation of a coupon using the matched coupon data.

The barcode detection technique may include localizing a barcode in the shopping container image data and decoding the localized barcode.

The object detection technique may be fast-RCNN.

The method may include generating location data, wherein the location data represents a current location of a user, and wherein the generating the matched coupon data includes generating the matched coupon data based on the location data.

The method may include aggregating the first detected item data and second detected item data, and wherein the aggregating includes comparing the first and second detected item data to identify differentially identified items.

Generating the matched coupon data may include considering historical purchase data for the user.

A method of training an item detection module used in a coupon offering system is also provided herein. The method includes receiving pre-purchase image data including at least one pre-purchase item; receiving post-purchase image data including at least one post-purchase item; wherein the pre-purchase image data and the post-purchase image data are from the same purchase transaction; generating first detected item data using the pre-purchase image data and second detected item data using the post-purchase image data; generating comparison data by comparing the first detected item data and the second detected item data; and training the item detection module using the comparison data.

The item detection module may be an object detector module, a barcode detector module, or a receipt processor.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 6 is a block diagram of a mobile application for use with a coupon offering system, according to an embodiment;

DETAILED DESCRIPTION

Figure 1:
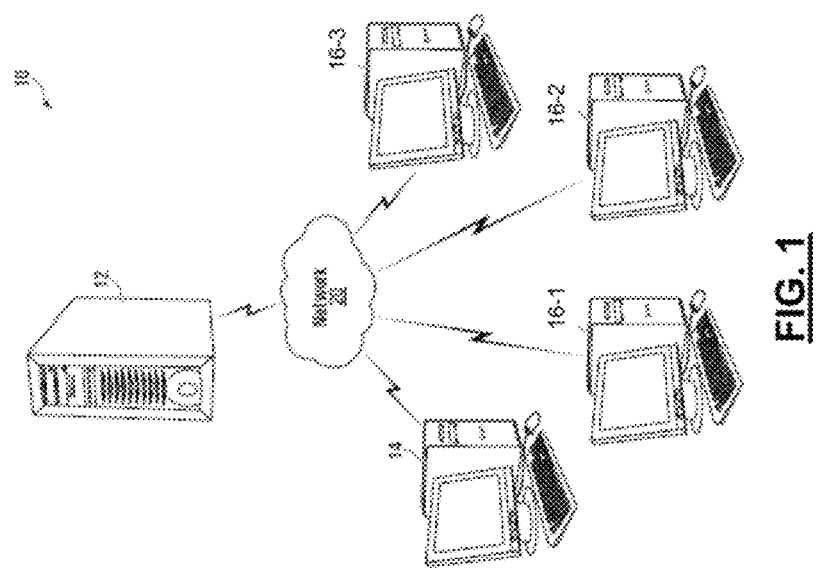
FIG. 1 is a schematic diagram of a coupon offering system, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The following relates generally to a coupon offering system and method. The coupon offering system can automatically and intelligently offer coupons to a user based on purchase information received from the user. The purchase information may include pre-purchase information, such as a shopping container photo, and/or post-purchase information, such as a receipt photo. In an embodiment, the purchase information is received directly from the user via a mobile application and is processed by a coupon offering server configured to generate coupon offerings using the received purchase information. The purchase information may also include any one or more of a purchase history, store information, and location data.

In an embodiment, a user, such as a consumer, can use a mobile application to take photos and transfer the photos with or without location information to a server platform. The server platform processes the received photos, retrieves matching coupons based on analysis of image data from the photos and source coupon data, and sends the matched coupons to the mobile application. The server platform may call additional services to improve the processing of received data and matching of coupons. The mobile application receives matched coupon data from the server platform and generates a machine-readable representation (e.g. a barcode) of the matched coupon. The user can then provide the machine-readable representation to a machine configured to read the machine-readable representation, such as by displaying a barcode on the user device (e.g. mobile device) and providing to a barcode reader. The coupon can be scanned or otherwise read and, once applied, can provide a discount at checkout.

The mobile application includes a user interface for the user to interact with the coupon offering system. The mobile application may be configured to access certain data on the user device, such as camera data and location data, and provide such data to the server.

The mobile application may display the matched coupons in multiple formats. For example, the mobile application may display the matched coupons in a machine-readable format (e.g. barcode), such as can be read by a checkout machine, and a more user-friendly, human-readable format.

The coupon offering server may implement one or more machine learning techniques for processing received image data (e.g. detecting items) and retrieving coupons. The system may utilize different machine learning techniques for processing different types of received image data (e.g. shopping container image data, receipt image data) in order to improve performance.

The purchase information may include shopping container image data. The term "shopping container" as used herein is understood to mean any container for holding merchandise or the like during a customer's shopping experience. Shopping containers may include shopping carts, shopping baskets, bags, boxes, and the like.

The coupon offering system may have various advantages. The system may reduce time and energy required of consumers for keeping track of coupons and remembering to use them. Using the system, users may be notified of coupons that present potential savings opportunities at an appropriate and practical time, such as when the user is in a checkout line, which is a process which may keep a user waiting between 2-10 minutes. The system may provide a relatively simple way for the user to find and use coupons, such as by having the user simply take a picture of a shopping container and/or receipt.

The coupon offering system may notify a user about new coupons. The offering of new coupons may be based on the user's shopping history (e.g. purchase history). In an embodiment, the user may upload a shopping container image to the system and receive instant coupons from the system. In another embodiment the user may upload a receipt image to the system and receive future coupons from the system. In another embodiment, the system notifies the user if a general coupon is available. In another embodiment, the system notifies the user if a new coupon matching the user's purchase history becomes available. The new coupon may be matched to the user based on a specific item, specific, brand, or specific store. In another embodiment, the system notifies the user if a new coupon matching any of the user's shopping list items becomes available.

The system can be advantageously configured to offer multiple types of coupons. Coupon types may include instant coupons and future coupons. Instant coupons are those coupons identified using pre-purchase data and that can be offered and applied while shopping (e.g. immediately before and at checkout). Future coupons include coupons identified and offered, at least partially, using post-purchase data, and which can be offered to users after shopping for future purchases. Offering instant and future coupons may provide many coupon offering opportunities, which may help consumers reduce shopping expenses considerably.

Advantageously, the systems and methods of the present disclosure give consumers a more active role in coupon offering systems. This contrasts with existing coupon offering systems that may have the coupon offering system operator pay stores directly in order to process a purchase receipt.

Furthermore, the systems and methods provided herein may provide coupons to users at convenient times, such as during shopping, and, in some cases, immediately before making a purchase.

The system may also analyze and consider user purchase history to offer user-relevant coupons. This may include, for example, directing a user to a particular product or store by offering a particular coupon for that product or store.

Referring now to FIG. 1, shown therein is a block diagram illustrating a coupon offering system 10, in accordance with an embodiment. The system 10 includes a coupon offering server platform 12, which communicates with a plurality of user devices 16-1, 16-2, and 16-3 (collectively referred to as user devices 16 and generically as user device 16). The user devices 16 may be customer or consumer devices that are associated with a particular customer or customers. The system 10 also includes a retailer information server platform 14, which can access and/or store retailer information.

The server platforms 12 and 14, and devices 16 may be a server computer, desktop computer, notebook computer, tablet, PDA, smartphone, or another computing device. The devices 12, 14, 16 may include a connection with the network 20 such as a wired or wireless connection to the Internet. In some cases, the network 20 may include other types of computer or telecommunication networks. The devices 12, 14, 16 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage or may be received from the Internet or other network 20.

Input device may include any device for entering information into device 12, 14, 16. For example, input device may be a keyboard, keypad, cursor-control device, touchscreen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, device 12, 14, 16 may include multiple of any one or more of processors, applications, software modules, second storage devices, network connections, input devices, output devices, and display devices.

Although devices 12, 14, 16 are described with various components, one skilled in the art will appreciate that the devices 12, 14, 16 may in some cases contain fewer, additional or different components. In addition, although aspects of an implementation of the devices 12, 14, 16 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 12, 14, 16 and/or processor to perform a particular method.

Devices such as server platforms 12 and 14 and devices 16 can be described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the devices 12, 14, 16 may send information to the server platforms 12 and 14. For example, a user using the device 16 may manipulate one or more inputs (e.g. a mouse and a keyboard) to interact with a user interface displayed on a display of the device 16. Generally, the device may receive a user interface from the network 20 (e.g. in the form of a webpage). Alternatively, or in addition, a user interface may be stored locally at a device (e.g. a cache of a webpage or a mobile application).

Server platform 12 may be configured to receive a plurality of information, from each of the plurality of devices 16 and the server 14.

In response to receiving information, the server platform 12 may store the information in storage database. The storage may correspond with secondary storage of the devices 16 and the server 14. Generally, the storage database may be any suitable storage device such as a hard disk drive, a solid-state drive, a memory card, or a disk (e.g. CD, DVD, or Blu-ray etc.). Also, the storage database may be locally connected with server platform 12. In some cases, storage database may be located remotely from server platform 12 and accessible to server platform 12 across a network for example. In some cases, storage database may comprise one or more storage devices located at a networked cloud storage provider.

The server platform 12 may be a purpose-built machine designed specifically for identifying, offering, and distributing electronic coupons to the user.

The server 12 includes multiple components configured to carry out various tasks in the coupon offering process.

Generally, the server 12 receives image data from a mobile application operating on the user device 16, analyzes the image data to detect items (purchased or to-be-purchased) in the image data, and identifies relevant coupons using the detected items. Identifying relevant coupons may include matching a detected item to a coupon and retrieving the matched coupon.

The server 12 transmits the matched coupons to the mobile application at the user device 16. The matched coupons may be transmitted in a useable form or may be further processed by the mobile application to generate a usable representation of the matched coupon. For example, a machine-readable representation of the matched coupon may be sent from the server 12 to the mobile application, or the mobile application may be configured to receive the matched coupon data and generate a machine-readable representation of the matched coupon. The result is that the user can access a version of the matched coupon that can be applied to a purchase (current or future).

In an embodiment, the coupon offering system 10 may be configured to offer instant coupons. Instant coupons are identified and made available to the user "instantly". The terms "instant" and "instantly" as used herein refer to the time between the user providing image data to the server 12 and the user receiving matched coupons from the server 12 based on the image data. The instant coupon feature may allow a user to receive coupons for purchases they are about to make. Instant coupons include coupons that can be applied on customer purchases at the time of purchase, such as at the time of checkout. Instant coupons may be identified based on data provided prior to a purchase transaction. The user can provide image data via the mobile application to the coupon offering server 12 and the server 12 can match coupons and transmit the matched coupons back to the user via the mobile applications. Instant coupons may be contrasted with future coupons, described below.

In an embodiment, the system 10 may be configured to offer future coupons. Future coupons include coupons usable by customers on future purchases. Future coupons may be identified based on data provided after a purchase transaction.

The instant coupons and future coupons may collectively be considered "purchase-required coupons." The term purchase-required coupons as used herein is intended to mean coupons that are identified and offered based on purchase information generated from a purchase transaction.

The system 10 may include a mobile application operating at one or more of devices 16. The mobile application is in communication with the coupon server 12. The mobile application may facilitate input of data (e.g. image data, location data) for processing by the coupon offering server 12, receipt of matched coupons generated from the input data, and storage and use of the received matched coupons.

The coupon offering system 10 may also be configured to identify and offer general (or purchasing behavior) coupons to a consumer. General coupons include coupons offered based on previous purchase transactions of the customer and do not necessarily require a purchase (or prospective purchase) in order to be offered to the user.

Figure 2:
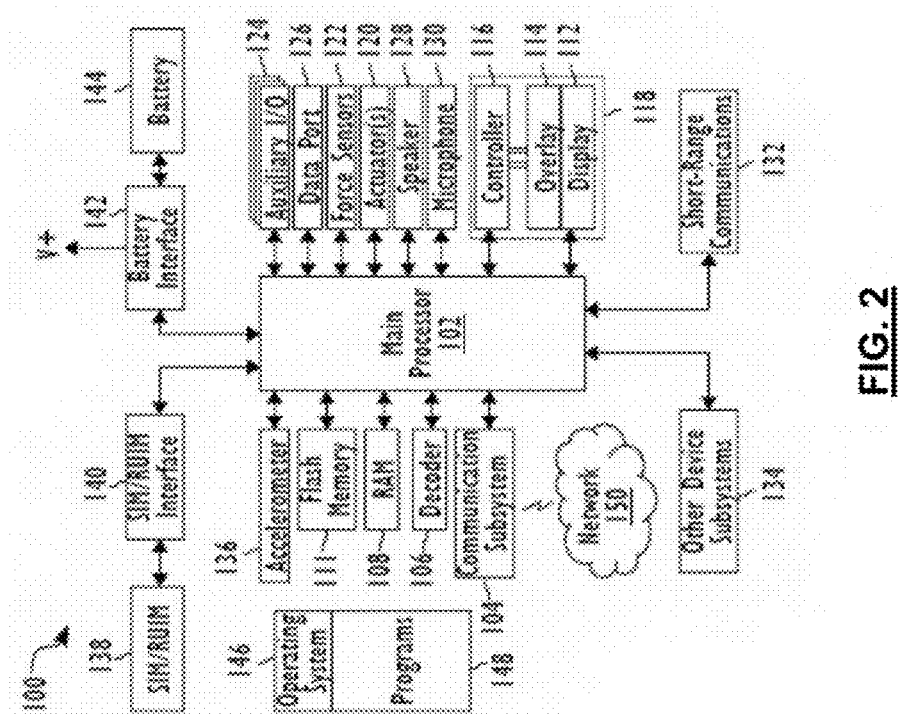
FIG. 2 is a block diagram of a computing device of FIG. 1, according to an embodiment.

FIG. 2 shows a simplified block diagram of components of a device 1000, such as a mobile device or portable electronic device. The device 1000 may be, for example, any of devices 12, 16, 18, 22 of FIG. 1. The device 1000 includes multiple components such as a processor 1020 that controls the operations of the device 1000. Communication functions, including data communications, voice communications, or both may be performed through a communication subsystem 1040. Data received by the device 1000 may be decompressed and decrypted by a decoder 1060. The communication subsystem 1040 may receive messages from and send messages to a wireless network 1500.

The wireless network 1500 may be any type of wireless network, including, but not limited to, data-centric wireless networks, voice-centric wireless networks, and dual-mode networks that support both voice and data communications.

The device 1000 may be a battery-powered device and as shown includes a battery interface 1420 for receiving one or more rechargeable batteries 1440.

The processor 1020 also interacts with additional subsystems such as a Random Access Memory (RAM) 1080, a flash memory 1100, a display 1120 (e.g. with a touch-sensitive overlay 1140 connected to an electronic controller 1160 that together comprise a touch-sensitive display 1180), an actuator assembly 1200, one or more optional force sensors 1220, an auxiliary input/output (I/O) subsystem 1240, a data port 1260, a speaker 1280, a microphone 1300, short-range communications systems 1320 and other device subsystems 1340.

In some embodiments, user-interaction with the graphical user interface may be performed through the touch-sensitive overlay 1140. The processor 1020 may interact with the touch-sensitive overlay 1140 via the electronic controller 1160. Information, such as text, characters, symbols, images, icons, and other items that may be displayed or rendered on a portable electronic device generated by the processor 102 may be displayed on the touch-sensitive display 118.

The processor 1020 may also interact with an accelerometer 1360 as shown in FIG. 1. The accelerometer 1360 may be utilized for detecting direction of gravitational forces or gravity-induced reaction forces.

To identify a subscriber for network access according to the present embodiment, the device 1000 may use a Subscriber Identity Module or a Removable User Identity Module (SIM/RUIM) card 1380 inserted into a SIM/RUIM interface 1400 for communication with a network (such as the wireless network 1500). Alternatively, user identification information may be programmed into the flash memory 1100 or performed using other techniques.

The device 1000 also includes an operating system 1460 and software components 1480 that are executed by the processor 1020 and which may be stored in a persistent data storage device such as the flash memory 1100. Additional applications may be loaded onto the device 1000 through the wireless network 1500, the auxiliary I/O subsystem 1240, the data port 1260, the short-range communications subsystem 1320, or any other suitable device subsystem 1340.

For example, in use, a received signal such as a text message, an e-mail message, web page download, or other data may be processed by the communication subsystem 1040 and input to the processor 1020. The processor 1020 then processes the received signal for output to the display 1120 or alternatively to the auxiliary I/O subsystem 1240. A subscriber may also compose data items, such as e-mail messages, for example, which may be transmitted over the wireless network 1500 through the communication subsystem 1040.

For voice communications, the overall operation of the portable electronic device 1000 may be similar. The speaker 1280 may output audible information converted from electrical signals, and the microphone 1300 may convert audible information into electrical signals for processing.

Figure 3:
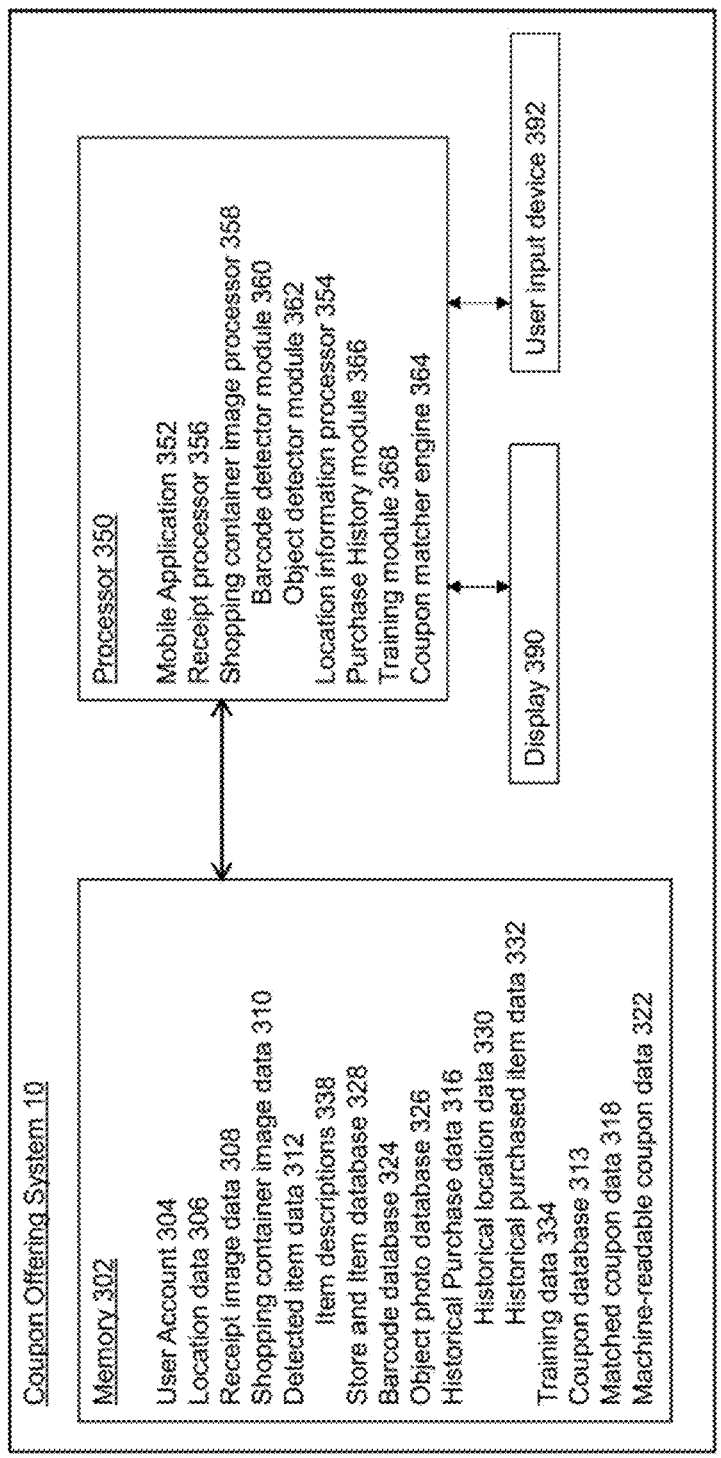
FIG. 3 is a block diagram of the coupon offering system of FIG. 1, according to an embodiment.

Referring now to FIG. 3, shown therein is the coupon offering system 10 of FIG. 1, according to an embodiment. Aspects, components, and functions of system 10 may be implemented at a single device, such as server 12 of FIG. 1, or at multiple devices (e.g. server 12 and one or more user devices 16 of FIG. 1).

The system 10 is configured to offer instant coupons and future coupons to a user. The system 10 may also be configured to offer general coupons to the user. The user may be, for example, a shopper or consumer. The user may be visiting a store such as a grocery store, clothing store, or other merchandiser, or may have recently visited a store.

The system 10 includes a memory 302. The memory 302 may be stored at a server (e.g. server 12 of FIG. 1) or a user device (e.g. user device 16 of FIG. 1).

The system 10 includes a processor 350 in communication with the memory 302. The processor 350 is configured to implement a plurality of modules and perform a plurality of functions described in detail below. The processor 350 may be located at the server (e.g. server 12 of FIG. 1) or at the user device (e.g. user device 16 of FIG. 1).

The memory 302 stores a user account 304. The user account 304 is an account linked to the user. The user account 304 may be stored at the server 12 or may be stored in a database or the like accessible to the server 12. The user account 304 is linked to various data in the system 10 associated with the user such that the system 10 can access, process, and present certain data to the user.

The processor 350 includes a mobile application 352. The mobile application 352 may be a client-side application operating on the user device 16 that is configured to interact with server-side components (e.g. operating at the server 12) to implement the various functionalities of the coupon offering system 10.

Generally, the mobile application 352 is configured to receive input from a user, transmit data to one or more server-side components, receive data from one or more server-side components, and display various data to the user.

In an aspect, the mobile application 352 allows the user to collect image data of a shopping container or receipt, transmit the image data to server-side components for processing and coupon matching, receive matched coupons from the server 12, and display the matched coupons in a manner suitable for review and use.

The mobile application 352 may include a plurality of software components for performing various functions. The mobile application 352 is described in further detail in reference to FIG. 6, below.

The mobile application 352 includes a user interface (e.g. user interface 602 of FIG. 6, below). The user can interact with the mobile application 352 and the system 10 via the user interface.

The user interface is displayed to the user via a display 390 and can receive user input via an input device 392. The display 390 and/or the input device 392 may be provided at the user device 16.

The user can upload a digital image to the system 10 using the mobile application 352. The digital image may be a receipt image 308 or a shopping container image 310. The receipt image 308 may be a photo of a hard-copy receipt from a purchase transaction that includes a list of purchased items. The shopping container image 308 may be a photo of a shopping container containing one or more pre-purchase items (i.e. items that have yet to be purchased).

The receipt image 308 and shopping container image 310 are stored in memory 302.

The shopping container image 310 and the receipt image 308 may be from the same purchase transaction. For example, the user may upload a shopping container image 310 prior to checkout and upload a receipt image 308 after the purchase transaction is completed (and a receipt is received). Some functionalities of the system 10 providing certain advantages may be enabled by the acquisition of pre-transaction and post-transaction images for the same purchase transaction.

The mobile application 352 transmits the shopping container image 310 and receipt image 308 to the coupon offering server 12.

In some cases, the mobile application 352 may be configured to transmit location data 306 to the coupon server 12. The location data 306 may be transmitted along with the images 308, 310 or separately. The user device 16 on which the mobile application is running may be configured to automatically generate location data 306.

The processor 350 includes a receipt processor 356. The receipt processor 356 receives and processes the receipt image data 308 in order to detect purchased items. Detected purchased items can be used in a coupon matching process. The receipt processor 356 generates detected item data 312 including the detected items.

Figure 4B:
FIGS. 4A and 4B are example receipt images processable by the receipt processor of FIG. 3.
Figure 4A:
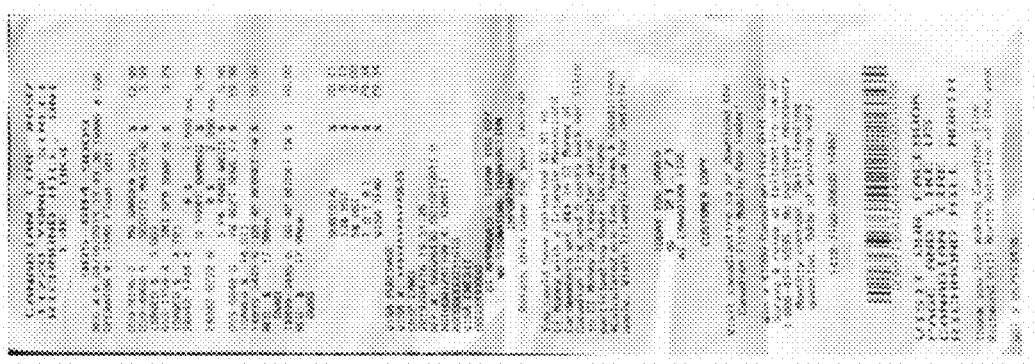

Example receipt images that can be processed by the receipt processor 356 are shown in FIGS. 4A and 4B. FIGS. 4A and 4B show receipt images 400, 450 that can be stored as receipt image data 308 and used by the coupon offering system 10.

The receipt processor 356 processes the receipt image data 308 using one or more machine learning techniques, such as optical character recognition (OCR). The receipt processor 356 is configured to look for and read certain receipt content data that can be used to identify purchased items. The receipt content data can be stored in memory 302.

The receipt processor 356 converts receipt image data 308 including written text describing various purchase information (e.g. purchased item, price, store, store location, etc.) into machine-readable text data. In an embodiment, the receipt processor 356 is configured to implement an optical character recognition ("OCR") technique for converting the receipt image data 308 into machine-readable text data. The machine-readable text data generated by the receipt processor 356 can be used to detect the purchased items in the receipt image data 308.

The OCR algorithm may be an existing algorithm. Advantageously, some well-known OCR algorithms have relatively high accuracy and performance metrics which may make the use of such OCR algorithms by the receipt processor 356 advantageous for the detection of purchased items.

The receipt content data detected by the receipt processor 356 includes a purchased item ID. The purchased item ID may be any unique identifier such as a name, a code, or the like specific to a particular product.

The receipt content data also includes store identity data and store location data. The store identity data may describe a name of the store at which the purchase was made (e.g. Shoppers Drug Mart), which may belong to a chain of stores. The store location data may describe an address, other geographic location information, or a store number that can be used to determine the particular store at which the purchase was made.

Each detected purchased item ID may be associated with store identity data and store location data to further facilitate the coupon matching process.

The receipt processor 356 is configured to retrieve an item description 338 using the receipt content data. An item description 338 can be retrieved for each purchased item detected in the receipt image data 308.

The receipt processor 356 may retrieve the item description 338 from a store and item database 328 accessible to the receipt processor 356. The store and item database 328 is stored in memory 302.

The store and item database 328 stores store identity data, item IDs, and item descriptions 338. Each store may be represented in the database 328 by store identity data (e.g. a store ID) that is unique to the store. Each store identifier may have a plurality of item IDs associated with it. The item IDs correspond to products offered by the store for purchase.

Each item ID in the store and item database 328 may have an associated item description 338. Accordingly, products or items offered by a store in the database 328 are represented by an item ID and an item description 338. The item description 338 may include an item name and a brand name. The item description 338 may include other descriptive information about the item (e.g. "Astro® Original Balkan Plain 6% 750 G").

The retrieved item description 338 can be provided as input to a coupon matcher engine (e.g. coupon matcher engine 364 described below) as part of a coupon matching process.

The processor 350 also includes a shopping container image processor 358. The shopping container image processor 358 receives the shopping container image data 310 from the mobile application 352 and processes the shopping container image data 310 to detect pre-purchase items contained in the shopping container. Detected items can be provided to a coupon matching engine for use in a coupon matching process.

The shopping container image processor 358 is configured to use one or more machine learning techniques to analyze the shopping cart image data 310 and generate detected item data 312.

Figure 5B:
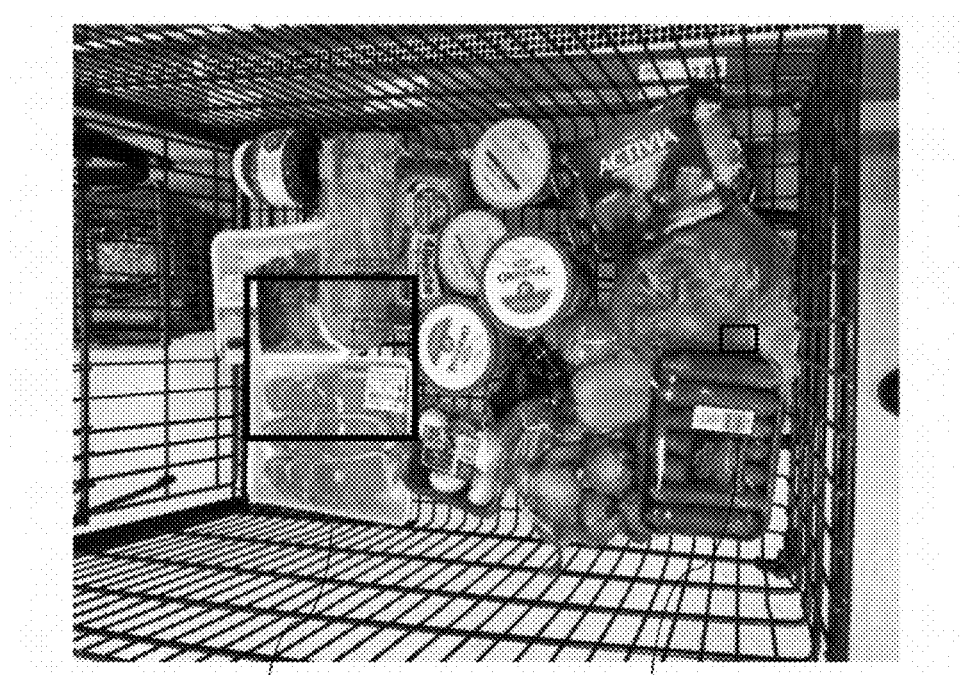
FIGS. 5A and 5B are example shopping cart images processable by the shopping cart photo processor of FIG. 3.
Figure 5A:
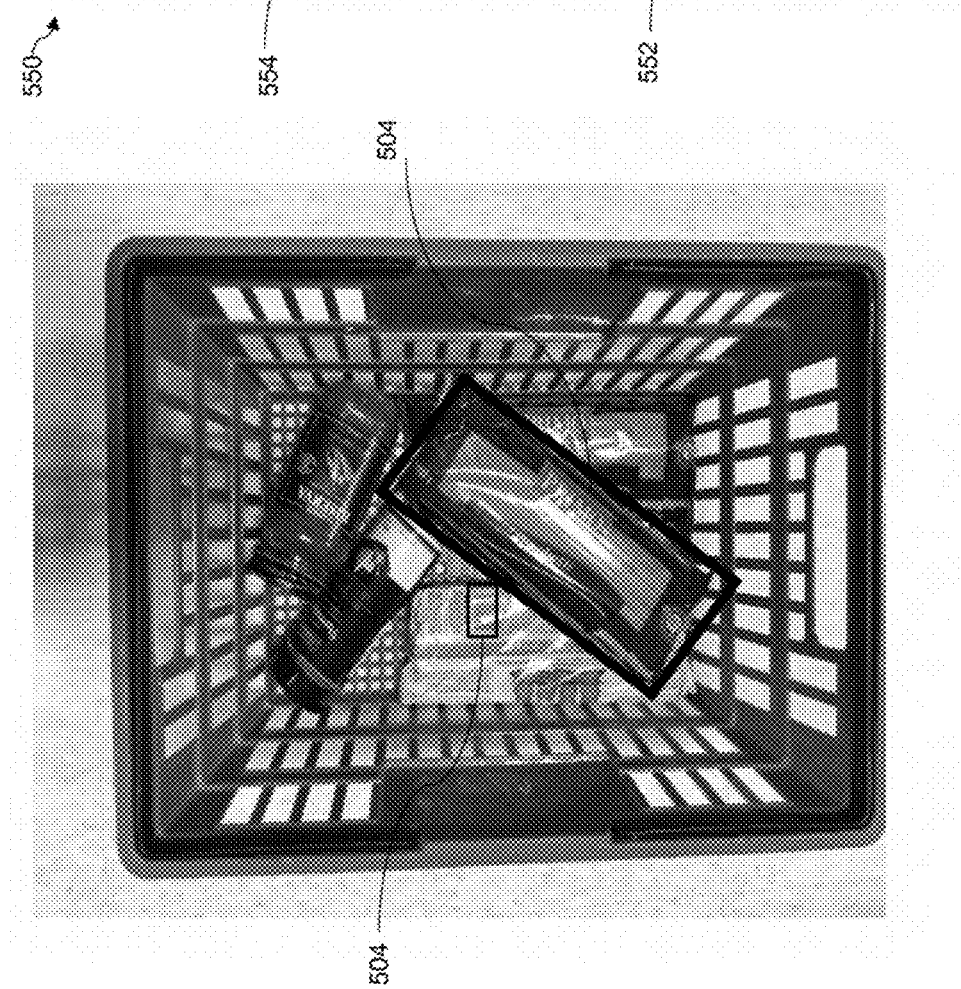

The shopping container image 310 may include objects (i.e. items) and barcodes (on the objects). Example shopping container images that can be processed by the shopping container image processor 358 are shown in FIGS. 5A and 5B. Shopping container images 500, 550 include example objects 502, 552 and example barcodes 504, 554.

The shopping cart processor 358 includes a barcode detector module 360 and an object detector module 362 for detecting barcodes and objects, respectively, in the shopping container image data 310.

The barcode detector module 360 and the object detector module 362 may be executed in parallel.

The outputs of the barcode detector module 360 and the object detector module 362 may be aggregated.

In variations, the shopping cart processor 358 may include only the barcode detection module 360 or the object detection module 362.

The barcode detector module 360 and the object detector module 362 may process data and generate detected item data 312 independently of one another. However, the use of both barcode detection and object detection techniques and the generation of their respective outputs may provide a synergistic effect to the system 10. The synergistic effect of the modules 360, 362 may provide more effective operation of the system 10, such as through improved item detection. The synergistic effects are described in detail below.

The barcode detector module 360 is configured to receive and analyze the shopping container image data 310 and detect one or more barcodes in the shopping container image 310. This may include capturing the barcodes in the shopping cart image data 310.

In variations, the barcode detector module 360 may be configured to detect forms of machine-readable item identifiers other than barcodes.

Generally, the detected barcode is associated with a pre-purchased item present in the shopping container of the user. The detected barcode may, for example, appear as a label on the item. In this sense, each item in the shopping container may have an associated barcode or other machine-readable identifier.

The barcode detector module 360 is configured to localize and decode barcodes in the shopping container image data 310. The barcodes may be 1D or 2D barcodes.

In an embodiment, the barcode detector module 360 may implement a barcode localization method that prioritizes accuracy over processing speed. Prioritizing accuracy may reduce missed barcodes that may negatively impact coupon matching and offering.

The barcode detector module 360 may be configured to implement one or more techniques for locating and decoding a barcode in a given image. Example techniques may include any one or more of a classical line scanning technique, morphological approaches, and wavelets.

In an embodiment, the barcode detector module 360 uses a combination of classical line scanning, morphological approaches, and wavelets. The combination of techniques implemented by the barcode detector module 360 may improve accuracy and speed of the system 10.

The barcode detector module 360 is in communication with a barcode database 324. The barcode database 324 is stored in memory 302. The barcode detector module 360 is configured to access or query the barcode database 324 using detected barcode data.

The barcode database 324 stores a plurality of barcodes and a plurality of item descriptions 338 for various items.

For each item there may be stored a barcode and an item description 338. The item may be a product or piece of merchandise, such as a bottle of laundry detergent. The barcode is detectable on the physical item.

The barcode (or barcode data representing the barcode) is linked in the database 324 to the item description 338 for the item. The item description may be any suitable descriptor for distinguishing the item from other items. The item description may be a unique name, number, code, or the like. Accordingly, barcode database 324 is structured such that the item description can be retrieved from the database 324 using the linked barcode, and vice versa.

The barcode detector module 360 detects a barcode in the received shopping cart image data 310. The barcode detector module 360 queries the barcode database 324 using the detected barcode itself or a barcode descriptor or identifier associated with the barcode.

As described above, the barcode is linked in the database 324 to an item description 338.

The barcode database 324 returns the item description 338 for the detected barcode.

The barcode detector module 360 provides the retrieved item description 338 to the coupon matcher engine 364 for use in the coupon matching process.

The object detector module 362 is configured to receive and analyze the shopping cart image data 310 and detect one or more objects in the shopping cart image 310 using an object detection technique.

The object detector module 362 may, for example, detect an object in the shopping container image data 310. The detected object is represented by an object descriptor. The object descriptor may be provided to a classifier trained to receive an object descriptor and output an item class.

The object detector module 362 is in communication with an object photo database 326. The object photo database 326 is stored in memory 302.

The object detector module 362 is configured to access or query the object photo database 326 using an output of the object detection process performed by the object detector module 362.

The object detection output may include an object descriptor for the detected object. The object descriptor may include one or more features derived from the image data 310 using one or more object detection techniques. The derived features may be distinct such that the object detector module 362 can distinguish items from one another using the object descriptor.

The object detector module 362 may determine an item description (which may be similar to item description 338) for the detected object using the object descriptor. The determined item description for the detected object can be used to find coupons for items having the same item description.

In an embodiment, the object photo database 326 stores a plurality of object descriptors and a plurality of item descriptions. The item descriptions may be similar to the item descriptions stored in the barcode database 324. Each item in the object photo database 326 includes an object descriptor and item descriptor. The object descriptor is linked to the item description for each item. The item description may include an item name and a brand name. The item description may include other information about the object (e.g. "Astro® Original Balkan Plain 6% 750 G").

The object descriptors and item descriptions are stored in the photo database 326 such that an item description can be retrieved using an object descriptor as input.

In this sense, the object photo database 326 may link the object descriptor to the item description to facilitate retrieval of the item description based on the object descriptor.

In an embodiment, the object detector module 362 uses a region-based convolutional neural network (RCNN). In particular, the object detector module 362 may use fast-RCNN. Fast R-CNN may achieve near real-time rates using very deep networks, while ignoring time spent on region proposals. Proposals may be test-time computational bottleneck in modern detection systems. Region proposal methods typically rely on inexpensive features and economical inference schemes. Selective Search, one of the most popular methods, greedily merges superpixels based on engineered low-level features. Yet when compared to efficient detection networks, Selective Search is an order of magnitude slower, at 2 seconds per image in a CPU implementation. Edge-Boxes currently provides good tradeoff between proposal quality and speed, at 0.2 seconds per image. Nevertheless, the region proposal step still consumes as much running time as the detection network. This performance is further improved by Faster R-CNN, which uses Region Proposal Networks (RPNs) that share convolutional layers with state-of-the-art object detection networks.

In an example using Fast CNN, an input image is fed to a convolutional neural network (CNN). The CNN generates convolutional feature maps. Regions of proposals are extracted using the convolutional feature maps. A region of interest (ROI) pooling layer is used to reshape the proposed regions into a fixed size so that it can be fed into a fully connected network. Each region is passed on to a fully connected network. A softmax layer is used on top of the fully connected network to output classes. Along with the softmax layer, a linear regression layer is also used in parallel to output bounding box coordinates for predicted classes. Fast CNN uses a single model which extracts features from the regions, divides them into different classes, and returns the boundary boxes for the identified classes simultaneously.

In an embodiment, the object detection module 362 implements a machine learning algorithm according to a supervised learning technique.

The supervised learning technique may use an annotated dataset for training an object detection model. The annotated dataset may be stored in an annotated dataset database, which may be stored in memory 302 or in storage otherwise accessible to the coupon offering system 10.

The annotated dataset may include a set of annotated datasets. In an embodiment, the annotated dataset includes one or more existing object detection datasets in the market and a grocery image dataset. This approach may provide a proper dataset for training the object detection model. The existing object detection datasets may be used as a starting point for the training.

The grocery image dataset includes a plurality of images of grocery or other retail items. The grocery image dataset may be generated by the coupon offering system 10. This may occur according to a user input to the system 10.

The grocery image dataset may be annotated using crowd-sourcing techniques. In an embodiment, users may be able to annotate grocery image dataset images using the coupon offering system 10. For example, a user may acquire an image of a particular item (e.g. via the user's mobile device) and upload and annotate the acquired image using a user interface of the coupon offering system 10. The coupon offering system 10 adds the annotated image to the grocery image dataset. In another example, the coupon offering system 10 may provide a user interface on the user's device that is configured to display an image of an item and receive an input from the user providing an annotation for the displayed image. The system 300 receives the annotation input, generates the annotated image, and adds the annotated image to the grocery image dataset.

The annotated dataset may be augmented using shopping container images and corresponding receipt images. In an embodiment, the coupon offering system 10 generates the augmented dataset by adding the shopping container images that have corresponding receipt images. The coupon offering system 10 may be configured to add images to the dataset in this manner automatically upon receiving shopping container images and corresponding receipt images. By generating the augmented annotated dataset, a very strong grocery dataset may be created for grocery (or other retail) shopping experiments performed by the coupon offering system 10.

In an embodiment, the supervised learning algorithm uses region proposal methods and region-based convolutional neural networks (RCNNs). The RCNN may be a Fast RCNN with very deep networks. The Fast RCNN may help the coupon offering system 10 achieve near real-time detection. This may be particularly advantageous in the shopping context, where embodiments of the coupon offering system 10 may be used immediately prior to checkout where time is limited and processing time to detect objects in a given image can be important.

In another embodiment, the supervised learning algorithm may use Selective Search. Selective Search may be used to increase detection accuracy, such as by greedily merging superpixels based on engineered low-level features. Selective Search may be slower in the detection step.

As the coupon offering system 10 receives more shopping container images and receipt images, the system 10 may continue to train the supervised machine learning algorithm. This may train the supervised learning algorithm to recognize new products. Such an approach may help train the object detection model to detect and identify products that were not available when the supervised learning algorithm was previously trained.

As one objective of the coupon offering system 10 may be to detect items that have potential coupons, the coupon offering system 10 may use reverse engineering and augment the datasets by adding additional annotated images of items with coupons. Using such a dataset may enable the machine learning algorithm to detect items with coupons with a higher accuracy.

Various challenges are associated with detection of items in shopping container images 310. Often pre-purchase items placed in a shopping container can be partially obscured. For example, a pre-purchase item may be partially obscured by its configuration or placement in the shopping container, or by other items or objects in the shopping container. Similarly, barcodes or other identifiers on the item may be obscured. Accordingly, a shopping container may contain one or more items that are not clearly identifiable (e.g. via an object detection technique) but have a visible barcode. Likewise, the opposite is possible where enough of the object is unobscured so as to be identifiable, but the barcode of the item is not visible.

To address this challenge, the system 10 may be advantageously configured to perform barcode detection and object detection on the same shopping container image 310 using the barcode detector module 360 and object detector module 362, respectively.

In doing so, the system 10 may be able to detect as many items in the shopping container image 310 as possible. In other words, by using both barcode detection and object detection techniques, the system 10 may be able to detect more items in the shopping cart image 310.

More detected items means coupons can be potentially identified or matched for more items and offered to the user, which can increase savings. Using only barcode detection or only object detection may lead to undetected items. Undetected items present a missed opportunity for the system 10 to match or identify coupons and missed opportunity for the user to save money on purchases.

The object detector module 362 may be configured to provide a confidence level for a detected item.

The object detector module 362 may compare the confidence level to a confidence level threshold. If the confidence level does not meet the threshold, a result from the barcode detector module 360 may be used to help identify the item. Similarly, if the object detector module 362 does not detect an item, the result from the barcode detector 360 may be used to help identify the item.

The processor 350 includes a location data processor 354.

The location data processor 354 processes location data 306 received from the mobile application 352 and determines a store identity for the location data 306. The store identity may be an identifier associated with a store at which the user is shopping or has shopped. The location data 306 may be GPS data or the like from which the user's location can be determined. In an embodiment, the location data processor 354 may use a web mapping service (e.g. Google Maps), for example via an API (e.g. Google Maps API). The location data processor 354 may use the web mapping service to find location information (e.g. store or plaza name) from the location data 306.

The location data processor 354 may also store received location data 306 and/or store identity data as historical location data. The historical location data includes locations visited by the user. The historical location data may be used by the system 10 (e.g. coupon matcher engine 364) to find and offer location-relevant coupons to the user.

The location data processor 354 may analyze the historical location data and detect user shopping preferences from the historical location data. The detected user shopping preferences can be stored in memory 302 as user preference data. The user preference data may include frequented stores and/or frequented locations for the user.

Frequented locations can be used to suggest coupons for stores in or near that location. Frequented stores can be used to suggest coupons for such stores.

The location data 306 can help the system in object detection by detecting a store identity. The store identity can be used to determine the type of items sold by the store (e.g. we don't (currently) buy groceries from Canadian Tire) and use that information to help distinguish items (e.g. by ruling out item identifications that don't make sense based on the store identity and the types of items sold by the identified store).

The processor 350 includes a training module 368.

The training module 368 is configured to receive data from one or more components (such as processors or modules of the system 10) of the system 10 and use the received data in a training process.

The training process may include training or retraining machine learning models or algorithms used by the receipt processor 356 or the shopping container image processor 358.

For example, the training module 368 may be configured to receive outputs of the coupon matching engine 364, receipt processor 356, or shopping container image processor 358, and use those outputs to further train the models and algorithms of the system 10 to make the models and algorithms more effective.

The training module 368 may be configured to identify training data 334 and train models using the training data 334. The training data 334 is stored in memory 302.

An example of how training via the training module 368 may be achieved will now be described.

Using the mobile application 352, a user may upload a receipt image 308 to the system 10. The receipt image 308 is uploaded a short period of time after the same user has uploaded a shopping container image 310. The shopping container image 310 and receipt image 308 may have been taken before and after the same purchase transaction, respectively.

The images 308, 310 were taken at the same store or location.

The receipt image 308 and shopping container image 310 may each include a timestamp or the like that can be used by the system 10 to determine when the images were taken.

The system 10 may be configured to determine an image location for the images 308, 310. For example, the system 10 may determine that the receipt image 308 and shopping container image 310 are from the same or similar location or store and are thus from the same purchase transaction.

The system 10 may do so by accessing location data 306 for the user (e.g. the user device 16).

The system 10 may do so by accessing store location data embedded within the image itself (e.g. a receipt that indicates a store location, such as an address, store name, store number or other identifier, etc.).

The system 10 may then compare time data for the receipt image 308 with time data for the shopping container image 310 and determine a relative likelihood that receipt image 308 and shopping container image 310 are from the same purchase transaction.

The system 10 may conclude that where the time difference between the shopping container image 310 and the receipt image 308 is relatively small (e.g. within an established threshold), the images 308, 310 are part of one transaction.

The training module 368 may use user-collected data from the same purchase transaction to further train one or more modules of the system 10, such as the barcode module 360 or the object detector module 362.

For example, a receipt should, in theory, list the same items as are included in a shopping container image 310 for the same purchase transaction, and vice versa. The user has the items he intends to buy in the shopping container prior to checkout and those items are captured in the receipt after checkout.

The training module 368 may leverage discrepancies between detected items in the shopping container image processor 358 and the receipt processor 356 in identifying training data 334.

For example, where there are discrepancies between items detected in the shopping container image 310 and the receipt image 308 for the same purchase transaction, it may be assumed that an item detection error was made (e.g. mistakenly identified items, items missed entirely) by one of the processors 356, 358. For example, the item detection error may have been made by either the shopping container image processor 358 or the receipt processor 356.

The training module 368 may flag data from purchase transaction for which item detection output from the receipt processor 356 and item detection output from the shopping container image processor 358 do not match. The data may be flagged as training data 334. Training data 334 may also include training data used to train the barcode detector module 360 and the object detector module 362.

The training module 368 may compare the item detection output of flagged data and determine what kind of items each of the processors 356, 358 were not able to detect. Certain parameters or configurations of the processors 356, 358 may be adapted in response.

The processor 350 includes a purchase history module 366.

The purchase history module 366 tracks and stores historical purchase data 316 for a user. The historical purchase data 316 includes purchase transactions for the user.

The historical purchase data 316 may include historical location data 330, such as visited locations and stores. The historical purchase data 316 may include historical purchased item data 332. The historical purchased item 332 data may include data about purchased items, such as a product type and a brand.

The historical purchase data 316 can be used to improve the accuracy and efficiency of various components and modules of the system 10.

The history retriever module 366 provides the historical purchase data 316 to the coupon matcher engine 364. The coupon matcher engine 364 can use the historical purchase data 316 to match and offer relevant coupons to the user.

The processor 350 includes a coupon matcher engine 364.

The coupon matcher engine 364 searches and retrieves coupons 318 matching items detected by the receipt image processor 356 or the shopping container image processor 358. Such coupons are referred to as matched coupons 318. The matched coupons 318 may be identified using a matching procedure implemented by the coupon matcher engine 364. The coupon matcher module 364 sends the matched coupons 318 to the mobile application 352.

A matched coupon 318 may be an instant coupon matching a shopping container image. A matched coupon 318 may be a future coupon matching a given receipt. A matched coupon 318 may be a general coupon available to everyone. A matched coupon 318 may be a future coupon matching the shopping history of the user.

A matched coupon 318 may be matched based on one or more coupon properties such as item, brand, or store. Accordingly, the matched coupon 318 may be a coupon matching a specific item (e.g. $2 off on TIDE detergent), a coupon matching a brand (e.g. 20% off any L'OREAL product, 10% off any AXE body wash), or a coupon matching store (e.g. 20X points for SHOPPERS DRUG MART).

The matched coupon data 318 can be converted into machine-readable coupon data 322 for use by the user.

The coupon matcher engine 364 may receive detected item data 312 including an item description 338. from the receipt image processor 356 or the shopping container image processor 358.

The coupon matcher engine 364 is in communication with a coupon database 313. The coupon database 313 stores coupons made available by stores and brands. The coupons may include all types of coupons such as purchase-required coupons, one-time only coupons, and general coupons.

The coupon matcher engine 364 may search the coupon database 313 using the detected item data 312 and retrieve matched coupons 318. For example, the coupon matcher engine 364 may search the coupon database 313 using one or more item descriptions corresponding to detected items.

The coupons may be stored in the coupon database 313 such that the coupons can be searched and matched using the detected item data 312 generated by the processors 356, 358.

The coupon matcher engine 364 may generate matched coupons 318 using a matching procedure. The matching procedure may include the application of machine learning techniques to match a coupon to a user.

The coupon matcher engine 364 may consider additional criteria in generating matched coupons 318.

The coupon matcher engine 364 may be configured to determine a coupon relevance for a coupon and determine whether the coupon relevance meets a predetermined threshold for generating a matched coupon 318. The coupon relevance reflects how relevant the coupon is to the user, based on certain criteria.

Criteria for coupon relevance may include location (store, geographic location) or item preferences (products, product types, brands).

The coupon matching engine 364 may offer a coupon with a high relevance and disregard a coupon with a low relevance.

The coupon matching engine 364 may receive and use location data 306, store identity data, or purchase history data 316 in determining coupon relevance.

In an example, the coupon matcher engine 364 may compare locations at which a coupon is redeemable and historical location data 330 for the user to determine whether the coupon is relevant to the user. If the coupon matcher engine 364 determines the coupon is relevant (e.g. the coupon is for a store that the user has frequented in the past) a matched coupon 318 is generated.

Referring now to FIG. 6, shown therein is the mobile application 352 of FIG. 3, according to an embodiment. The mobile application 352 includes a plurality of software components or modules that, when executed by the processor 350, cause the mobile application 352 (and the user device 16) to perform various operations and functions of the system 10.

The software components of the mobile application 352 may be configured to interact with other mobile application software modules and/or server-side software modules in order to effect various features and functionalities of the system 10.

The mobile application 352 includes a user interface 602. The user interface 602 allows the user to interact with the coupon offering system 10. The user interface 602 displays various data (such as data stored in memory 302) and information generated and stored by the system. The user interface 602 is configured to receive input from the user related to the identification and use of matched coupons 318.

Example functionalities of the user interface 602 may include allowing the user to take and upload a photo (e.g. images 308, 310) to the system 10 for analysis, view matched coupons 318, or to access and use machine-readable representations 322 of matched coupons 318.

The mobile application 352 may include a camera accessor module 604. The camera accessor module 604 is configured to access a camera of the user device 16 in order to acquire and/or access image data (e.g. image data 308, 310) that can be analyzed by the system 10.

For example, the user may take a photo of a shopping container or a receipt using the camera of the user device 16. The camera accessor module 604 accesses and retrieves the photo for use by the system 10.

The mobile application 352 may include a location data accessor module 606. The location data accessor module 606 is configured to access location information for the user device 16.

For example, the user device 16 may be configured to generate and store location data 306. In some cases, the location data 306 may be associated with an image acquired by a camera of the user device 16. The location data accessor module 606 accesses the location data 306. The location data 306 can be associated with a particular image 308, 310 that is provided to the system 10 by the user.

The location data 306 may be used by the coupon offering server 12 to identify a store location (e.g. what store a purchase event took place at) or a geographic area in which the user is frequently present and shopping, for example. The location data 306 may be used by the server 12 to augment the identification and offering of matched coupons 318 to users.

The mobile application 352 includes a notification module 608. The notification module 608 may perform one or more functions related to a coupon-related notification. For example, the notification module 608 may determine, generate, and/or display a coupon-related notification. The coupon-related notification provides the user with information about the user's matched coupons 318, such as an upcoming expiry date of a matched coupon 318 or a newly available matched coupon 318.

In an embodiment, the notification module 608 is configured to access a device notification system of the user device 16. The notification module 608 identifies or receives an indication (e.g. from server 12) of available or expiring matched coupons 318. The notification module 608 generates a notification based on the identification or received indication. The notification module 608 displays the notification using the device notification system of the user device 16.

In an embodiment, the notification module 608 may be configured to determine whether a notification condition is satisfied and, if the notification condition is satisfied, generate a corresponding notification.

Examples of notification conditions may include user presence in a particular geographic location or store (e.g. user within 1 km of a location or store), coupon expiry date (e.g. coupon expires one week from current date), and coupon has recently been identified or matched by the system 10 (i.e. notifying of a new coupon).

Determining whether a notification condition is satisfied may include the notification module 608 (or other system component, such as a server-side software component) querying certain coupon metadata. The coupon metadata may include a coupon expiry data or a store location, for example.

The system 10 may determine store coupon expiry dates and availability statuses for matched coupons 318.

The notification module 608 may keep the user apprised of coupon expiry dates and inform users of available coupons 318. Such actions may facilitate more effective use of coupons by the user. More effective use of coupons can save the user money and may demand less of the user's attention and time to keep track of coupons.

The mobile application 352 includes a coupon displayer module 610. The coupon displayer module 610 is configured to display matched coupons 318.

The coupon displayer module 610 may include a machine-readable coupon displayer 612 and a human-readable coupon displayer 614.

The machine-readable coupon displayer 612 is configured to generate and/or display a machine-readable version 322 of the matched coupon 318. The machine-readable version may be, for example, a barcode version of the coupon 318 readable by a barcode-reading checkout machine or the like.

The user can access and display the machine-readable version 322 of the coupon 318 on their device 16 using the user interface 602 and present the coupon 318 to a machine reader via the user device 16.

The machine-readable coupon displayer 612 may advantageously provide the user with a convenient electronic version 322 of the matched coupon 318 that can be applied with minimal effort and without having to manage paper coupons.

The machine-readable coupon displayer 612 may advantageously allow the user to apply the matched coupons 318 using a device (e.g. the user's mobile device) that is often already in the possession of a shopping user, thereby removing the requirement to either bring necessary coupons on the shopping trip or know in advance which stores and what purchases are going to be visited and made.

The human-readable coupon displayer 614 is configured to generate and/or display a human-readable version of the matched coupon 318.

The human-readable coupon displayer 614 may advantageously present a user-friendly version of the matched coupons 318 so that the user can view available coupons, confirm which coupon the user is using, select coupons, etc.

In embodiments having both human-readable and machine-readable display capabilities, the user can view and understand what coupons he has available and can use the coupons with minimal effort using the user device 16.

In some cases, the mobile application 352 may include one or more ancillary features.

The ancillary features are complementary to the coupon-related features of the system 10. In many cases, such features are related or linked in some way to shopping and the purchase of goods by the user, though not directly related to the identification and use of coupons. By their inclusion in the mobile application 352, these ancillary features may provide the user with a more robust application for managing purchasing habits and experiences.

Various ancillary feature of the mobile application 352 according to embodiments will now be described. Such ancillary feature may be implemented as one or more software components executable by a processor, such as processor 350, located at user device 16 or server 12.

The mobile application 352 may include an expense reporter module 616.

The expense reporter module 616 may calculate, retrieve, and/or display a report of the user's shopping expenses.

In doing so, the expense reporter module 616 may access coupon usage data stored by the system 10 as well as historical purchase data 316 for the user in order to determine or display savings attributable to the use of coupons offered via the system 10. Coupon usage data includes data about how matched coupons 318 have been used for purchases.

The expense report generated by the expense reporter module 616 may be in any suitable display format and may include one or more types of visual displays such as graphs, tables, charts, or the like.

The expense reporter module 616 may generate periodic reports of user expenses (e.g. monthly, yearly).

The mobile application 352 may include an expense categorizer module 618.

The expense categorizer module 618 may access or retrieve user expense data. The user expense data may be generated by the system 10 using historical purchase data 316 and coupon usage data. The user expense data can then be categorized by the expense categorizer module 618.

The expense categorizer module 618 may directly or indirectly identify cost saving opportunities for the user.

The expense categorizer module 618 may visually present user expense data in such a way that the user can identify or determine cost saving opportunities from the categorized user expense data.

The expense categorizer module 618 may visually present user expense data in such a way that such saving opportunities are more explicitly displayed or communicated to the user (e.g. highlighting savings opportunities).

The expense categorizer module 618 may provide the user expense data to the user interface 602 for display.

In displaying cost saving opportunities, the expense categorizer module 618 may link to or reference coupons 318 available to the user that may provide cost savings and reduce expenses.

The mobile application 352 may include a shopping list generator module 620.

The shopping list generator module 620 creates a user shopping list for future purchases. The user shopping list includes a plurality of items. The shopping list generator module 620 may update the user shopping list periodically.

The shopping list generator 620 may access historical purchase data 316 such as purchased items, item-specific data (what items and types of items the user purchased), purchase frequency, and purchase dates to create the user shopping list.

The shopping list generator module 620 may create the shopping list autonomously or with input from the user.

The shopping list generator module 620 may search the user's matched coupons 318 for coupons that are relevant to the user shopping list. For example, the shopping list generator module 620 may search matched coupons 318 stored by the system 10) for items that match items in the user shopping list. The shopping list may include a plurality of item descriptors representing items in the shopping list. The shopping list item descriptors are compared with item descriptors for the matched coupons 318. Where there is a match between an item descriptor in the shopping list and an item descriptor in the matched coupons 318, the shopping list generator module 620 may create a link in the shopping list to the matched coupon 318. This may help make the user aware of the coupon 318 and simplify its use.

Figure 7:
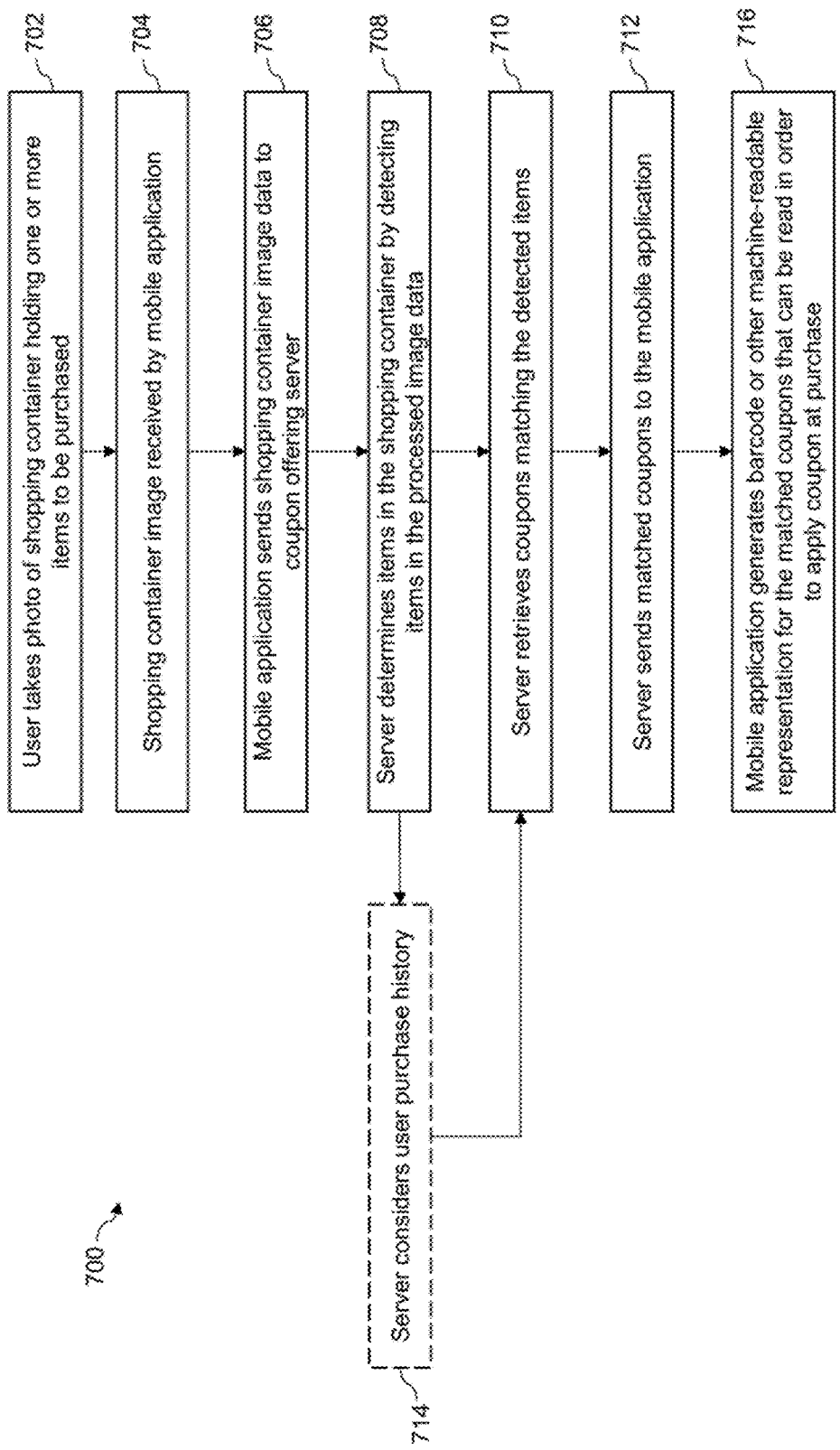
FIG. 7 is a flowchart of a method of offering coupons using a shopping container image, according to an embodiment.

Referring now to FIG. 7, shown therein is a flowchart of a method 700 for offering coupons to a user based on a shopping container image provided by the user, according to an embodiment. The method 700 may be implemented by the system 10 of FIG. 1.

At 702, the user takes a photo of a shopping container holding one or more items. The photo may be captured by a camera of the user device 16. The shopping container photo is stored as shopping container image data 310.

At 704, the shopping container image data 310 is received by the mobile application 352. The image 310 may be automatically uploaded into the system 10, or the user may select an image 310 to upload from the user device image storage to the mobile application 352.

At 706, the mobile application 352 sends the shopping container image data to the coupon offering server 12 over a network such as the Internet.

At 708, the coupon offering server 12 processes the shopping container image data 310 and detects items in the user shopping container based on the processed shopping cart image data 310. The shopping container image data 310 is processed by the shopping container image processor 358.

The shopping container image data 310 may be processed using object detection and/or barcode detection techniques to detect items in the shopping container image. Detected items 312 may each be represented by an item descriptor that can be used to identify or match coupons for those items.

At 710, the coupon offering server 12 retrieves coupons 318 matching the detected items 312. This may include searching one or more source coupon databases 313. The source coupon database or databases may be run by an operator of system 10 or by one or more third parties.

Generally, the source coupon database 313 stores coupons offered by retailers or other third parties. Each source coupon 314 includes one or more items that are the subject of that coupon. For example, in a coupon for detergent, the item is the detergent. The coupons may be stored in the source coupon database 313 such that the item or items that are the subject of a coupon can be searched and retrieved using an item descriptor. The item descriptor may describe or represent a general product (e.g. detergent) or a brand-specific product (TIDE detergent).

At 712, the coupon offering server 12 sends the matched coupons 318 to the mobile application 352 operating at the user device 16.

Optionally, at 714, the coupon offering server 12 considers a user purchase history in the coupon matching process performed by the coupon offering server 12. The user purchase history is stored as historical purchase data 316.

The historical purchase data 316 may include a plurality of purchase transactions made by the user. Each purchase transaction may include various data about the transaction such as a purchased item, item type, brand, date, time, location, store, price, quantity, etc. The purchased item may be represented by an item descriptor. The historical purchase data 316 may further include data such as frequently purchased items, stores, brands, locations, price ranges, etc.

The coupon offering server 12 may use the historical purchase data 316 in generating matched coupons 318.

At 716, the mobile application 352 generates a barcode or other machine-readable representation 322 of the matched coupons 318. The machine-readable representation 322 can be read in order to apply the matched coupon 318 at purchase.

In some cases, the machine-readable coupon 322 may be generated at the coupon offering server 12 and transmitted to the mobile application 352 for use by the user.

Figure 8:
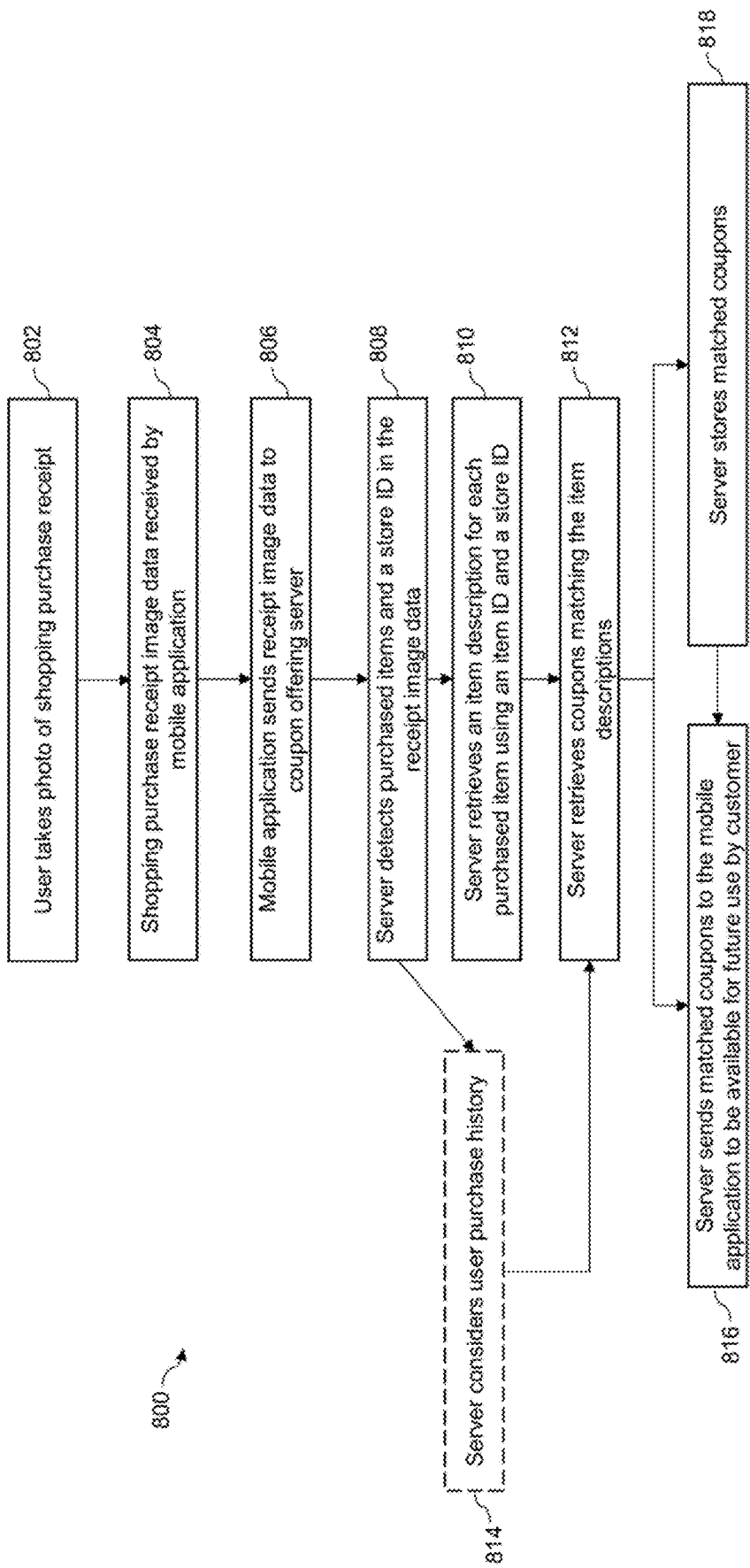
FIG. 8 is a flowchart of a method of offering coupons using a receipt image, according to an embodiment.

Referring now to FIG. 8, shown therein is a flowchart of a method 800 for offering coupons to a user based on a receipt photo provided by the user, according to an embodiment.

The method 800 may be performed by system 10 of FIG. 1. The method 800 includes steps and actions that may be performed by the server 12 and at the user device 16.

At 802, the user takes a photo of a shopping purchase receipt including one or more purchased items. The photo may be captured by a camera of the user device 16. The receipt photo is stored as receipt image data 308.

At 804, the receipt image data 308 is received by the mobile application 352. The image 308 may be automatically uploaded into the system 10, or the user may select an image 308 to upload from the user device image storage to the mobile application 352.

At 806, the mobile application 352 sends the receipt image data 308 to the coupon offering server 12 over a network such as the Internet.

At 808, the coupon offering server 12 processes the receipt image data 308. The processing includes detecting purchased items 312 listed on the receipt.

The coupon offering server 12 analyzes the receipt image data 308 and detects purchased items and store data. The store data may include a store and a store location. Detecting purchased items may include reading item identifiers (item IDs) for the purchased items.

The receipt image data 308 may be processed by the coupon offering server 12 using optical character recognition.

The store data and the item identifier can be used by the coupon offering server 12 in a coupon matching process.

At 810, the coupon offering server 12 retrieves an item description or descriptor for each purchased item using the detected item ID and store ID. This may include searching a database storing store IDs, item IDs, and item descriptions. Each store (corresponding to a store ID) may have a plurality of items. Each item may have an item ID and an item description. Querying the database with a store ID and an item ID may return an item description for the item.

At 812, the coupon offering server 12 retrieves coupons matching the purchased items detected by the coupon offering server 12 at 808. The coupon offering server 12 uses the item description retrieved at 810 to match the coupons.

The coupon offering server 12 performs a coupon matching process using the detected items from the receipt image data and source coupon data. The coupon matching process compares data associated with the detected items with data associated with source coupon data to identify matches. For example, the coupon matching process may include comparing an item descriptor for the detected item with an item descriptor for a source coupon. If the item descriptors match (i.e. implying the coupon is for the item appearing on the receipt), the coupon matching process identifies a match and flags the coupon as an offered coupon. The output of the matching process is one or more matched coupons.

For example, a coupon may be for an item and the item is represented by an item description. The item description from the coupon may be the same or similar to the item description retrieved from the database at 810 such that a search of a coupon database using the item description from 810 includes matching the item description in the search to an item description for the coupon. Matching the item description in this manner generates a matched coupon 318.

Optionally, at 814, the coupon offering server 12 considers user purchase history in performing the coupon matching process. The user purchase history is stored as historical purchase data 316.

The historical purchase data 316 may include a plurality of purchase transactions made by the user. Each purchase transaction may include various data about the transaction such as a purchased item, item type, brand, date, time, location, store, price, quantity, etc. The purchased item may be represented by an item descriptor. The historical purchase data 316 may further include data such as frequently purchased, items, stores, brands, locations, price ranges, etc.

The coupon offering server 12 may use the historical purchase data 316 in generating matched coupons 318.

At 816, the coupon offering server 12 sends the matched coupons to the mobile application 352. The matched coupons 318 are available to the user for future use.

In some cases, at 818, the matched coupons 318 are linked to a user account associated with the user and stored accordingly. The matched coupons 318 may be stored at the user device 16, at the coupon offering server 12, or in a database accessible to the user device 16 or server 12.

The mobile application 352 is configured to receive a matched coupon 318 generated using the method 800 and generate a machine readable representation 322 of the coupon 318 that can be read in order to apply the coupon at the time of a future purchase transaction.

Figure 9:
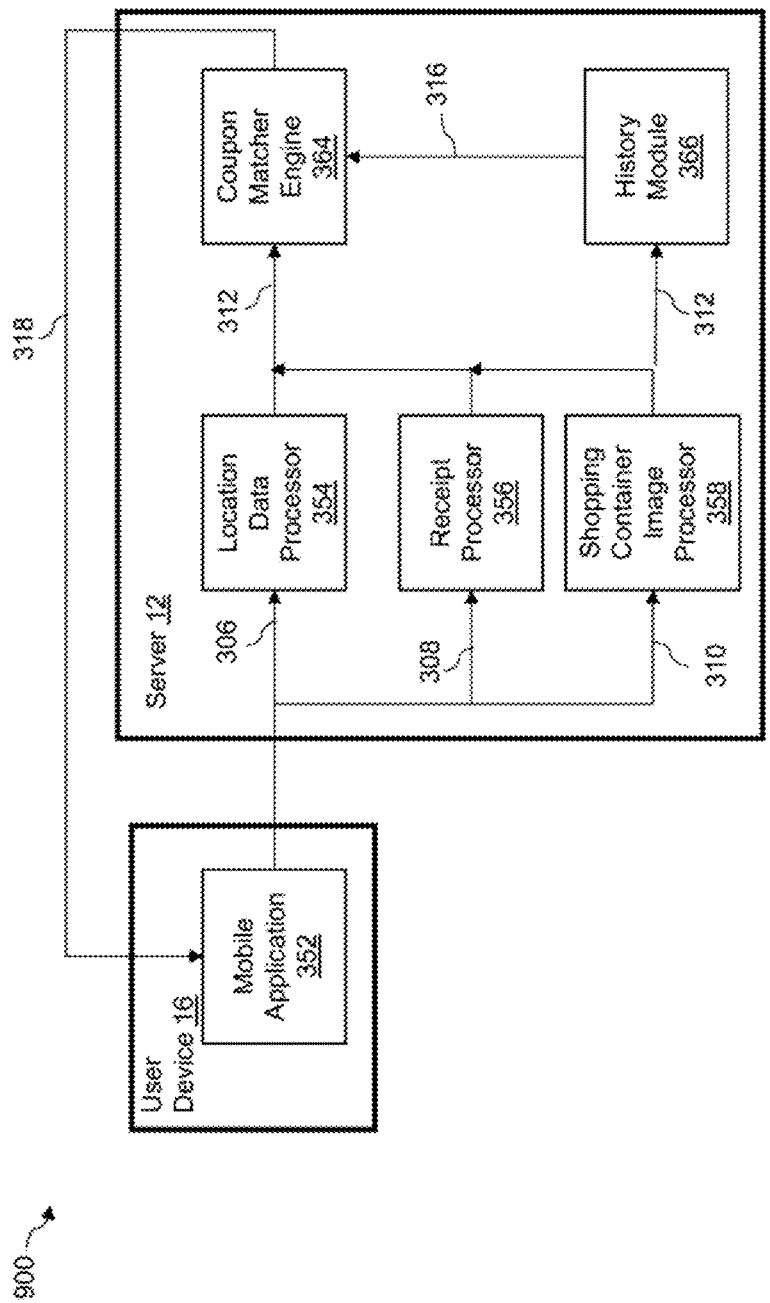
FIG. 9 is a schematic diagram illustrating data flow in the coupon offering system of FIG. 1, according to an embodiment.

Referring now to FIG. 9, shown therein is a schematic of data flow 900 for the coupon offering system 10 of FIG. 1, according to an embodiment.

As illustrated, the system 10 includes mobile application 352, location information processor 354, receipt processor 356, shopping container image processor 358, coupon matcher engine 364, and history retriever module 366.

The mobile application 352 is located at user device 16 and the components 354, 356, 358, 364, and 366 are located at the coupon offering server 12. The user device 16 and the coupon offering server 12 communicate over a network, such as the Internet.

A customer interacts with the mobile application 352 (for example, via user interface 402) at the user device 16. This may include taking a receipt photo and a shopping container photo using a camera of the user device 16. The receipt photo and shopping container photo are stored as receipt image data 308 and shopping container image data 310, respectively. The shopping container photo may be taken prior to a purchase transaction, while the receipt photo may be taken after the same purchase transaction. In such a case, items in the shopping container are likely represented on the receipt and vice versa. In this sense, detected items 312 from the receipt image data 308 and the shopping container image data 310 may be the same.

The mobile application 352 provides various data to the components of the coupon offering server 12 including the receipt image data 308 and shopping container image data 310. The mobile application 352 also provides location data 306 to the coupon offering server 12. The location data 306 may be embedded with the image data 308, 310, for example giving a location for the photo, or provided separately. The location data 306 may include GPS coordinates or the like.

The location data 306 may be provided at or around the same time as the shopping container image data 310. The location data 306 may then be used to identify a store at which the user is currently shopping.

The mobile application 352 passes the location data 306 to the location data processor 354. The location data processor 354 is configured to process the received location data 306 and determine a store at which the user is shopping or has shopped.

The location data processor 354 may, for example, query a store location database using the location data 306. The store location database may include data for a plurality of stores. Each store may have an associated store identifier and a location. The store location database may be queried using a location (i.e. location data 306) and return a store identifier. The store identifier may include data unique to the store that can be used by other components of the system 10 (e.g. coupon matcher engine 364) to identify coupons for that particular store.

The location data processor 354 generates detected store data (such as a store identifier) from the location data 306 that is passed to the coupon matcher engine 364.

The location data processor 354 may improve results of the image processing components 308, 310 of the system 10. The location data processor 354 may help the coupon matcher engine 364 to offer coupons matching the detected store. The location data processor 354 may be used to detect the user's shopping preferences (i.e. store preferences) which may then be used by the coupon matcher engine 364 to offer coupons with relevance and convenience (e.g. frequented store, frequented location, current location) to the user.

The mobile application 352 passes the receipt image data 308 to the receipt processor 356. The receipt processor 356 processes the receipt image data 308. In an embodiment, processing is performed using OCR.

Processing the receipt image data 308 includes detecting store identifying data. The store identifying data includes one or more types of data that can be used to identify a particular store. The store identifying data may include a store name, a store location or address, or a unique store identifier such as a store number or code.

Processing the receipt image data 308 also includes detecting purchased item identifying data. The purchased item identifying data may include a purchased item ID or the like. The purchased item ID may be a unique code or number for the item.

The receipt processor 356 is in communication with a database storing data about stores and their items.

Using the detected store identifying data and purchased item identifying data, the receipt processor 356 retrieves an item description from the database for each item detected in the receipt image data 308.

The item descriptions are passed by the receipt processor 356 to the coupon matcher engine 364.

The mobile application 352 passes the shopping container image data 310 to the shopping container image processor 358. The shopping container image processor 358 processes the shopping container image data 310. In an embodiment, the shopping container image data 310 is processed using barcode detection and object detection techniques. The techniques may be executed in parallel to improve the item detection process.

The shopping container image processor 358 localizes and decodes barcodes in the shopping container image data 310.

The shopping container image processor 358 also detects objects in the shopping container image data 310. Each detected object may be represented by an object descriptor.

The shopping container image processor 358 may implement a machine learning model trained using an item dataset. The trained model can detect an object and generate detected item data 312 (e.g. an item identity) for the detected object. The detected item data 312 may include an item description. The detected item data 312 is passed by the shopping container image processor 358 to the coupon matcher engine 364 for use in the coupon matching process.

The history module 366 tracks and stores a historical purchase data 316 for the user. Historical purchase data 316 may include detected item data 312 reflecting purchases by the user. Historical purchase data 316 may also include location data 306 received from the location data processor 354 indicating where purchases have been made.

Historical purchase data 316 can be used to improve the efficiency and accuracy of components of the system 10. For example, the history module 366 may incorporate the receipt image data to evaluate and improve accuracy of object detection in corresponding shopping container image data 310. The history module 366 may provide data to the coupon matcher engine 364 such as location data 306 and a user's most frequented stores (which may be determined by the history module 366 using the location data 306) to improve relevance of offered coupons.

As described above, outputs from the receipt processor 356, shopping container image processor 358, the location data processor 354, and history module 366 are passed to the coupon matcher engine 364. The outputs include detected item data (e.g. item description), detected store data, and historical purchase data 316.

The coupon matcher engine 364 is in communication with one or more coupon databases. The coupon database stores coupons offered by brands and stores. Stores may include store chains (e.g. Canadian Tire) and specific instances of store chains (e.g. Canadian Tire #697).

The coupon matcher engine 364 queries the coupon database using the detected item data and detected store data, which returns matched coupons 318 corresponding to the provided data.

In some cases, the coupon matcher engine 364 may query the coupon database using the detected item data and receive matched coupons 318 for the items. The coupon matcher engine 364 may then determine relevance of a matched coupon 318 to the user, for example by considering the detected store data generated by the location data processor 354 or historical purchase data 316 generated by the history module 366. By considering such data, the coupon matcher engine 364 offers matched coupons 318 to the user that are particularly relevant to the user.

The coupon matcher engine 364 passes the matched coupons 318 to the mobile application 352.

Once received by the mobile application 352, the matched coupons 318 can be used by the user. The mobile application may generate a machine-readable representation of the matched coupon 318 for use.

While the above description provides examples of one or more apparatus, methods, or systems, it will be appreciated that other apparatus, methods, or systems may be within the scope of the claims as interpreted by one of skill in the art.

The invention claimed is:

1. A computer system for offering coupons to a purchaser user, the computer system comprising:
   a coupon offering server including:
      a shopping container image processor configured to detect a pre-purchase item in shopping container image data, the shopping container image processor including:
         an object detector module configured to generate first detected item data, wherein the first detected item data includes an item detected in the shopping container image data using a machine learning-based object detection model trained to localize and classify objects in the shopping container image data; and
         a barcode detector module configured to generate second detected item data, wherein the second detected item data includes an item detected in the shopping container image using a barcode detection technique configured to localize and decode at least one barcode in the shopping container image data to obtain the second detected item data;
      wherein the shopping container image processor compares a confidence level of the first detected item data generated by the object detector module to a predetermined confidence level threshold and uses the barcode detector module to detect the pre-purchase item when the confidence level does not meet the predetermined confidence level threshold; and
   a coupon matcher engine configured to:
      receive the first and second detected item data from the shopping container image processor;
      generate matched coupon data using the first and second detected item data;
      wherein the matched coupon data comprises a machine-readable representation to apply a matched coupon at purchase; and wherein the coupon offering server is further configured to transmit the matched coupon data to a user device associated with the purchaser user.

2. The system of claim 1, wherein the coupon offering server further comprises a receipt processor configured to detect a post-purchase item in receipt image data.

3. The system of claim 2, wherein the detecting the post-purchase item in the receipt data includes detecting a purchased item identifier and at least one of a store identity and a store location in the receipt image data.

4. The system of claim 1, wherein the user device is communicatively connected to the coupon offering server via a network, wherein the user device includes an application configured to:
   transmit the shopping container image to the coupon offering server via the network;
   receive the matched coupon data from the coupon offering server; and
   display the matched coupon data.

5. The system of claim 1, wherein the coupon offering server further comprises a location data processor configured to:
   receive location data from the user device communicatively connected to the coupon offering server, wherein the location data represents a current location of the purchaser user; and
   determine a store identity using the location data.

6. The system of claim 5, wherein the coupon matcher engine is further configured to receive the store identity and generate the matched coupon data using the store identity.

7. The system of claim 1, wherein the barcode detection technique includes localizing a barcode in the shopping container image data and decoding the localized barcode, and wherein the barcode detector module is further configured to retrieve an item identifier using the detected barcode.

8. The system of claim 1, wherein the shopping container image processor is further configured to generate aggregated detected item data from the first detected item data and second detected item data.

9. The system of claim 8, wherein the aggregated detected item data is generated by comparing the first detected item data and the second detected item data to identify differentially identified items.

10. The system of claim 9, wherein the differentially identified items are used in a training process for training at least one of the object detector module and barcode detector module.

11. The system of claim 1, wherein the coupon matcher engine is further configured to receive historical purchase data for the purchaser user and generate the matched coupon data using the historical purchase data.

12. A method of offering coupons to a purchaser user, the method comprising:
   receiving shopping container image data;
   detecting a pre-purchase item in the shopping container image data, wherein the detecting includes:
      generating first detected item data, wherein the first detected item data includes an item detected in the shopping container image data using a machine learning-based object detection model trained to localize and classify objects in the shopping container image data; and
      generating second detected item data, wherein the second detected item data includes an item detected in the shopping container image using a barcode detection technique configured to localize and decode at least one barcode in the shopping container image data to obtain the second detected item data;

comparing a confidence level of the first detected item data to a predetermined confidence level threshold; and using the second detected item data to identify the pre-purchase item when the confidence level associated of the first detected item data does not meet the predetermined confidence level threshold;

generating matched coupon data using the first and second detected item data, the matched coupon data comprising a machine-readable representation of a coupon; and transmitting the matched coupon data to a user device associated with the purchaser user.

13. The method of claim 12, wherein the barcode detection technique includes localizing a barcode in the shopping container image data and decoding the localized barcode.

14. The method of claim 12, wherein the object detection technique is fast-RCNN.

15. The method of claim 12, further comprising generating location data, wherein the location data represents a current location of a user, and wherein the generating the matched coupon data includes generating the matched coupon data based on the location data.

16. The method of claim 12, further comprising aggregating the first detected item data and second detected item data, and wherein the aggregating includes comparing the first and second detected item data to identify differentially identified items.

17. The method of claim 12, wherein the generating the matched coupon data includes considering historical purchase data for the purchaser user.

* * * * *